3,185,729
DIAMINO CAPROIC ACID DERIVATIVES AND
PROCESS OF MAKING SAME
Bernard Goffinet, Paris, and Gaston Amiard, Noisy-le-Sec, France, assignors to Roussel-UCLAF, Paris, France, a corporation of France
No Drawing. Filed June 21, 1960, Ser. No. 37,569
Claims priority, application France July 17, 1956, 718,686
1 Claim. (Cl. 260—534)

The present invention relates to a process of producing derivatives of diamino caproic acid, and more particularly to the preparation of betaines of α,ε-diamino caproic acid (DL-lysine).

The present application is a continuation in part of our copending application Serial No. 669,467, filed July 2, 1957, now abandoned and entitled "Derivatives of diamino caproic acid and method of preparing same."

It is one object of the present invention to provide a simple and highly effective process of producing valuable derivatives of α,ε-diamino caproic acid (DL-lysine).

Another object of the present invention is to provide the new and valuable α-dibenzylamino-ε-amino caproic acid and derivatives thereof.

Still another object of the present invention is to provide new betaines of α,ε-diamino caproic acid.

A further object of the present invention is to provide a highly lipotropic agent useful in therapy.

Other objects of the present invention and advantageous features thereof will become apparent as the description proceeds.

In principle the present invention has for its purpose the preparation of α,ε-bis-(trimethylamino)caproic acid of the following Formula I

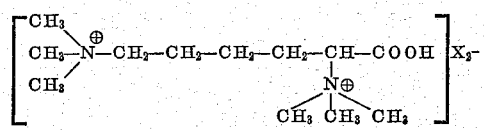

wherein X is an anion such as the anion of hydrochloric acid and other pharmaceutically acceptable substantially non-toxic acids.

Examples of compounds coming within the scope of this invention are not only said α,ε-bis-(trimethylamino) caproic acid, but also the respective mono-betaine compounds:

α-Trimethylamino-ε-amino caproic acid, and
α-Amino-ε-trimethylamino caproic acid as well as their salts and derivatives.

Due to their quaternary ammonium function the above noted compounds have a pronounced surface activity and produce strongly foaming aqueous solutions. Due thereto and to the fact that they are non-toxic, they can be employed for the preparation of emulsions to be used pharmaceutically and in the food industry.

According to the present invention, the above-mentioned compounds are readily produced by using as starting material an ε-acylamino-α-bromo or chloro caproic acid. Said starting material is obtained by saponification of caprolactam to ε-amino caproic acid, acylation of the amino group, and halogenation in α-position by means of bromine, iodine, sulfurylchloride, or the like.

By reacting the ε-acylamino α-bromo or chloro caproic acid of Formula II of the reaction diagram in column 3 with dibenzylamine ε-acylamino-α-dibenzylamino caproic acid of Formula III is obtained which is then saponified to ε-amino-α-dibenzylamino caproic acid of Formula IV. Said acid is subjected to exhaustive methylation by means of suitable methylating agents, such as dimethyl sulfate or methyl iodide or bromide, in order to produce ε-trimethylamino-α-dibenzylamino caproic acid of Formula V. The amino group in α-position is set free by hydrogenolysis, thereby yielding the betaine of Formula VI.

Another procedure for preparing the α-trimethylamino-ε-amino caproic acid of Formula IX consists in treating the compound of Formula II with ammonia to produce ε-acylamino-α-amino caproic acid of Formula VII.

Said compound of Formula VII can also be obtained by hydrogenolysis of the compound of Formula III. Said ε-acylamino-α-amino caproic acid is then subjected to exhaustive methylation, thereby yielding ε-acylamino-α-trimethylamino caproic acid of Formula VIII, saponification of which sets free the amino group in ε-position and yields the desired betaine of Formula IX.

α,ε-Bis-(trimethylamino)caproic acid of Formula X can be produced by methylation of the compounds of Formula VI or IX or from DL-lysine (α,ε-diamino caproic acid) of Formula XI which can be prepared from the compound of Formula II by amination and saponification or by hydrogenolysis of the compound of Formula IV.

The following diagram illustrates the above described process:

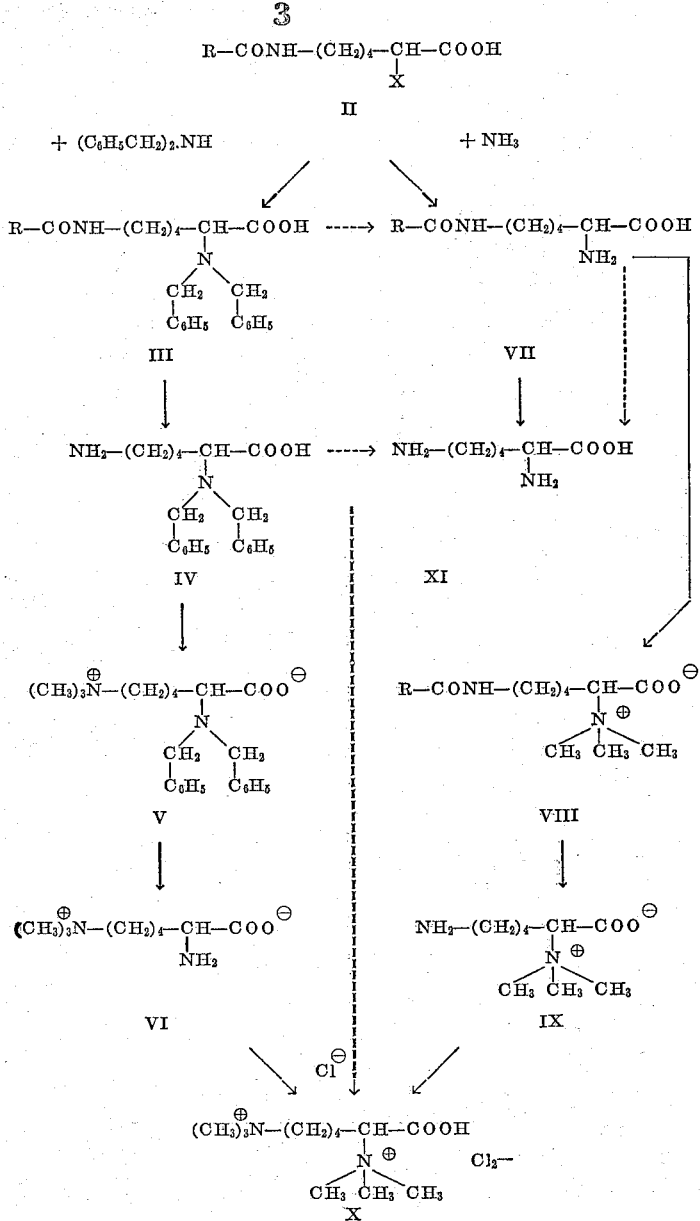

In said formula:

R indicates a radical, such as a lower alkyl radical or an aryl radical and preferably phenyl and
X indicates halogen, such as chlorine, bromine, or iodine.

According to another embodiment of the present invention condensing of ε-benzoylamino-α-bromo caproic acid with dibenzylamine is carried out in a suitable solvent, such as ethanol, or methanol, or propanol and the like while heating. Thereby, three moles of dibenzylamine are used, the first mole for the reaction, the second mole to neutralize the acid group of the starting material and the third mole to neutralize the hydrobromic acid formed. By dissolving the reaction mixture in a suitable solvent, such as ether, wherein the dibenzylamine hydrobromide is insoluble, one third of the dibenzylamine used is readily recovered. That amount of base used for neutralizing the acid group is recovered by displacement by diethylamine. Finally, the dibenzylated derivative of Formula III is obtained by the addition of an organic acid in the presence of a suitable solvent such as chloroform which is not miscible with water. Thereby, the diethylamine is split off in the form of its salt and is eliminated by washing with water. The compound of Formula III obtained after evaporation of the solvent is converted into the compound of Formula IV by acid or alkaline hydrolysis; the benzoic acid split off thereby is separated due to its insolubility in water in an acid medium. Evaporation of the hydrochloric acid solution of the compound of Formula IV produces the crystalline dihydrochloride of the compound of Formula IV which retains certain amounts of free hydrochloric acid and water. It is purified according to the usual methods, for instance, by distilling off the hydrochloric acid with water followed by distillation with a solvent producing an azeotropic mixture with water. Treatment with ammonia converts the dihydrochloride of the compound of Formula IV into the free acid of Formula IV. Exhaustive methylation of said compound, either in the free acid form or as its dihydrochloride, with dimethylsulfate in the presence of potassium hydroxide, yields the compound of Formula V which is purified by dissolving it in a solvent wherein the inorganic salts are insoluble. Excess methylating agent and the ester of the compound of Formula V formed during the reaction are hydrolyzed by means of hydrochloric acid. The resulting sulfuric acid is eliminated by suitable treatment in the form of its barium salt or its calcium salt. Excess barium or calcium chloride are eliminated in turn by a treatment with a solvent wherein they are insoluble. Thereby, the hydrochloride of the compound of Formula V is obtained which, when treated with silver oxide, yields the free trimethylated dibenzylamino acid of Formula V, hydrogenolysis of which in the presence of hydrochloric acid produces the desired betaine of Formula VI.

According to another embodiment of the present invention, the compound of Formula IX is obtained by methylating α-amino-ε-benzoylamino caproic acid of Formula II as indicated above. The resulting reaction product is purified and then converted in an analogous manner as described above into the compound of Formula VI. Hydrochloric acid hydrolysis of the ester eliminates at the same time the benzoyl group.

The compound of Formula X with two quaternary ammonium groups is also obtained by exhaustive methylation of DL-lysine. Said compound is purified in a similar manner as described for the purification of the compound of Formula VI.

The following examples serve to illustrate the present invention without, however, restricting or limiting its scope. In particular it is possible to replace the α-brominated ε-benzoylamino caproic acid by its corresponding α-chlorinated derivative as starting material and to protect the amino group in ε-position by other acyl groups, such as the acetyl, propionyl, lauroyl, and the like acyl groups, to use other methylating agents than dimethyl sulfate or other solvents without thereby exceeding the scope of the invention.

It will be noted that the melting points of the various examples as given hereinafter are instantaneous melting points determined on the Maquenne block.

EXAMPLE 1

*Preparation of α-dibenzylamino-ε-benzoylamino caproic acid (Formula III, wherein $R=C_6H_5$) starting from ε-benzoylamino-α-bromo caproic acid (of Formula II, wherein $R=C_6H_5$ and $X=Br$)*

94 g. of the compound of Formula II, having a melting point of 165–166° C., are dissolved in 400 cc. of absolute alcohol, to which 200 g. of dibenzylamine have previously been added. The solution is refluxed for six hours, 500 cc. of ether are added and the solution is then allowed to stand in a refrigerator, or under like conditions over night. The precipitated dibenzylamine hydrobromide is washed with a mixture consisting of equal parts of absolute alcohol and ether and thereafter with ether and is filtered. After drying, 76.3 g. of dibenzylamine hydrobromide are recovered, which can be used to supply the dibenzylamine required for another operation identical with that just described.

The filtrate is combined with the wash waters and is mixed with 45 cc. of diethylamine so as to displace the dibenzylamine that has neutralized the acid group of the reaction product of Formula III. The solution is then evaporated to dryness, the residue is cooled in ice, and is washed with petroleum ether which dissolves the dibenzylamine, the diethylamine salt of the reaction product being insoluble in this solvent. The solution in petroleum ether yields, after evaporation, dibenzylamine which can be used again for the preparation of the compound of Formula III. The diethylamine salt of said compound is obtained in the form of a viscous oil and is dissolved in 600 cc. of chloroform, to which 50 cc. of acetic acid are added in order to set free the acid of Formula III. The chloroform solution is washed with water so as to eliminate diethylamine acetate. It is then decanted, dried over magnesium sulfate, filtered over decolorizing charcoal, and the solvent is removed by distillation in a vacuum.

94 g. of α-dibenzylamino-ε-benzoyl amino caproic acid of Formula III are obtained in the form of a viscous orange oil, insoluble in water, slightly soluble in ether, but soluble in acetone, alcohol, benzene, and chloroform.

This compound has not been described heretofore in the literature.

EXAMPLE 2

*Preparation of α-dibenzylamino-ε-amino caproic acid of Formula IV, starting from α-dibenzylamino-ε-benzoylamino caproic acid (Formula III, wherein $R=C_6H_5$)*

1000 cc. of concentrated hydrochloric acid and 500 cc. of water are stirred with 94 g. of the compound of Formula III produced according to Example 1, and the solution is refluxed for about 17 hours. Thereby, benzoic acid is formed which precipitates from the solution. The solution is then cooled, filtered, and washed with 6 N hydrochloric acid. The wash waters are combined with the filtrate and the solution is evaporated to dryness in a vacuum. The residue is dissolved once again in water, the larger part of which is evaporated so as to carry along the remainder of the hydrochloric acid. One liter of acetone is aded. The resultant solution is cooled in ice, stirred, and allowed to stand in a refrigerator over night. It is then filtered and washed with acetone, thereby yielding, after drying, 78 g. of the compound of Formula IV in the form of its hydrochloride. The yield is 65% calculated for the compound of Formula II. The compound is sufficiently pure for further operations. It may be purified by dissolution in hydrochloric acid, filtering while hot, and adding acetone thereto until crystallization starts. The melting point of the resulting dihydrochloride of the compound of Formula IV rises to 150° C.

The resultant product is insoluble in acetone, benzene, chloroform, and ether, difficultly soluble in cold alcohol, and soluble in water and hot alcohol.

The analysis of this compound shows a formula of $C_{20}H_{28}O_2N_2Cl_2$, ½ $CH_3COCH_3$, and a molecular weight of 428.4.

Calculated: 60.3% C; 7.3% H; 6.5% N; 16.5% ionizable Cl. Found: 60.4% C; 7.1% H; 6.6% N; 16.4% ionizable Cl.

This compound has not been described heretofore in literature.

In order to produce the free acid of the compound of Formula IV, 4.6 g. of its dihydrochloride containing 15% of the solvent are dissolved in 10 cc. of water. 5 cc. of concentrated ammonia (about 10 N) are added thereto. The free α-dibenzylamino-ε-amino caproic acid crystallizes in the form of large colorless needles. The mixture is cooled, filtered, and recrystallized from 50% alcohol. The crystals are filtered off by suction and are dried, yielding 3.2 g. of the free acid of Formula IV of the melting point 130° C., whereafter it solidifies and melts again at 210° C.

This compound is insoluble in ether, acetone, and chloroform, very difficultly soluble in water, soluble in hot alcohol, soluble in dilute acids. It retains 10% of water of crystallization which corresponds to 2 moles of water. On analysis, it was found that it corresponds to the formula $C_{20}H_{26}O_2N_2$ and has a molecular weight of 326.43.

Calculated: 73.58% C; 8.03% H; 9.8% O; 8.58% N. Found: 73.6% C; 8.1% H; 9.5% O; 8.2% N.

This compound has not been described heretofore in the literature.

The compound of Formula IV yields a monoflavianate which can be prepared easily by dissolving 2 g. of its dihydrochloride in 10 cc. of alcohol and adding thereto 1.8 g. of flavianic acid dissolved in 10 cc. of boiling water. The hot orange solution thus produced is allowed to stand in a refrigerator. The monoflavianate crystallizes in yellow needles, is filtered, washed with water, and recrystallized from 50% alcohol. 2.2 g. of the flavianate are obtained in beautiful yellow-orange needles of the melting point 200° C. This compound is slightly soluble in alcohol and insoluble in most of the other conventional solvents. It loses 4.5% of its weight when kept at 100° C. in a vacuum.

This compound has not been described heretofore in the literature.

EXAMPLE 3

*Preparation of α-dibenzylamino-ε-trimethylamino caproic acid of Formula V, starting from α-dibenzylamino-ε-amino caproic acid of Formula IV*

78 g. of the crude dihydrochloride of the compound of Formula IV, the preparation of which has been described in Example 2, are dissolved in an ice-cold mixture of 50 g. of potassium hydroxide and 200 cc. of water. The solution is cooled and at the same time 80 g. of potassium hydroxide dissolved in 180 cc. of water and 150 cc. of dimethyl sulfate are gradually added in small quantities, while the temperature of the mixture is maintained lower than 25° C. When said potassium hydroxide solution has been added, the resultant mixture must still be alkaline. It is heated on a water bath for half an hour, acidified to a pH of about 5.0 by the addition of sulfuric acid, and finally evaporated to dryness in a vacuum. The oily residue is dissolved in 200 cc. of ice-cold absolute methanol, so as to separate the dissolved compound of Formula V from the inorganic salts. The mixture of potassium chloride and potassium sulfate which is insoluble in alcohol is filtered off and is washed with ice-cold ethanol. The wash alcohol is combined with the filtrate and the mixture is evaporated to dryness in a vacuum. The residue is dissolved in 400 cc. of concentrated hydrochloric acid and is heated and refluxed for 8 hours in order to destroy excess dimethylsulfate as well as to hydrolyze the methyl ester of the compound of Formula V which has partly been formed. 400 cc. of an aqueous solution of 25% of barium chloride are added thereto so as to precipitate the sulfate ions. This precipitate is filtered off. The filtrate is passed through decolorizing carbon and is evaporated to dryness in a vacuum. The resultant residue is cooled and 95% alcohol is added, wherein excess barium chloride is insoluble. After filtering off the barium chloride and washing the precipitate with alcohol, the filtrate is combined with the wash alcohol and is evaporated to dryness in a vacuum. The residue consisting of the dihydrochloride of the compound of Formula V is dissolved in acetone and is allowed to crystallize while cooling in a refrigerator. By filtering off the crystals with suction, washing with acetone and drying, there are produced 84 g. of the crude dihydrochloride of the compound of Formula V which is sufficiently pure for conversion into α-amino-ε-trimethylamino caproic acid of Formula VI. It can easily be purified by dissolving it in 2 parts by volume of N hydrochloric acid and by the successive addition of alcohol and acetone until it starts to become turbid. The resultant pure dihydrochloride which is obtained after allowing the mixture to crystallize for one hour is filtered off with suction and is dried. It is obtained in the form of small colorless needles.

This compound is slightly hygroscopic and has a melting point of 170° C. with decomposition. It is insoluble in acetone, benzene, chloroform, and ether, very difficultly soluble in alcohol, but soluble in water and in aqueous dilute acids and alkalies. The compound loses 2.5% of its weight when dried at 80° C. in a vacuum. Its analysis shows that it corresponds to the formula $C_{23}H_{32}O_2N_2$, $2HCl.\frac{1}{5} H_2O$ of the molecular weight of 445.0.

Calculated: 62.07% C; 7.79% H; 6.3% N; 15.93% ionizable Cl. Found: 62.0% C; 7.7% H; 6.3% N; 15.9% ionizable Cl.

It is a new compound.

In order to prepare free α-dibenzylamino-ε-trimethylamino caproic acid of Formula V, from said dihydrochloride, 6 g. of the latter are dissolved in 50 cc. of water. 5 g. of freshly precipitated, moist silver oxide are gradually added in small quantities thereto. The solution is stirred vigorously for one hour, filtered, and washed with water. The filtrate must be free of chlorine ions. It is carefully evaporated in a vacuum in a large distillation flask, because it foams strongly. The evaporation residue is dissolved in alcohol, filtered, the filtrate is evaporated to dryness, and the residue is dissolved in acetone. The compound of Formula V crystallizes at once. On allowing the mixture to stand in a refrigerator over night, the crystals are filtered off and washed with acetone and then with ether. 4.6 g. of the compound of Formula V (yield: 90%) are obtained. The compound sublimates at about 200° C. It is insoluble in acetone, ether, and chloroform, slightly soluble in benzene, soluble in alcohol, water, and aqueous dilute acids. Analysis of the product is carried out after recrystallization from alcohol and drying in a vacuum at 100° C., whereby it loses 5.9% of its weight.

Its analysis shows that it corresponds to the formula $C_{23}H_{32}O_2N_2.\frac{1}{3}H_2O$ of the molecular weight of 374.5.

Calculated: 73.8% C; 8.79% H; 7.48% N. Found: 73.8% C; 8.6% H; 7.6% N.

EXAMPLE 4

*Preparation of α-amino-ε-trimethylamino caproic acid of Formula VI, starting from α-dibenzylamino-ε-trimethylamino caproic acid of Formula V*

8.5 g. of crude α-dibenzylamino-ε-trimethylamino caproic acid of Formula V, produced by treating its hydrochloride with silver oxide as described in Example 3, are dissolved in a mixture of 25 cc. of water, 50 cc. of acetic acid, and 2 cc. of concentrated hydrochloric acid. 5 g. of 10% palladium on charcoal are added and hydrogenolysis is carried out while stirring, the solution being heated to 70° C. from the moment hydrogen absorption slows down until the theoretical quantity of hydrogen has been absorbed. The solution is cooled, the catalyst is filtered off and washed with water. The filtrate is combined with the wash waters and is evaporated to dryness in a vacuum. The residue is freed from free hydrochloric acid by distillation with water and is dried by azeotropic distillation with toluene, benzene, or chloroform. The residue, consisting of the hydrochloride of the desired quaternary ammonium compound of Formula VI is dissolved in 20 cc. of alcohol. It crystallizes at once. The crystals are filtered off and washed with alcohol and thereafter with ether. On drying, 3.9 g. of the colorless compound of Formula VI (yield: 77% or 50% calculated for the starting compound of Formula II) are obtained. The compound is sufficiently pure for use in practice or conversion into other compounds.

Its melting point is 240° C. (with decomposition). It is insoluble in acetone, benzene, chloroform, and ether, very difficultly soluble in alcohol, soluble in methanol, and very soluble in water. The compound can readily be recrystallized by dissolving it in a small volume of water and by adding acetone and alcohol to this solution until it starts to become turbid. The resultant precipitate is obtained in the form of thin hexagonal leaves (flakes) arranged in the form of rosettes. The compound is not hygroscopic. Its infrared spectrum shows bands at 1740, 1587, and 1530 cm.$^{-1}$, characteristic of an α-amino acid hydrochloride. Furthermore, it shows a positive reaction to ninhydrin.

Its analysis shows that its corresponds to the formula $C_9H_{22}O_1N_2Cl_2$ of the molecular weight of 261.20.

Calculated: 41.38% C; 8.49% H; 12.25% O; 10.75% N; 27.14% ionizable Cl. Found: 41.4% C; 8.4% H; 12.1% O; 10.6% N; 27.0% ionizable Cl.

This crystalline compound is new and is readily characterized by its gold salt and by its diflavianate. The melting point of its diflavianate is 275–280° C. It is prepared according to the usual methods.

EXAMPLE 5

*Preparation of α-trimethylamino-ε-amino acid of Formula IX, starting from α-amino-ε-benzoylamino caproic acid of Formula VI (R=C₆H₅)*

The starting compound of Formula VII may be prepared, according to known methods, reacting the compound of the Formula II, wherein R indicates $C_6H_5$, with ammonia, or by hydrogenolysis, according to the method described in Example 4, of the compound of Formula III wherein R indicates $C_6H_5$. 12.6 g. of α-amino-ε-benzoylamino caproic acid of Formula VII are dissolved in a solution of 3 g. of potassium hydroxide and 20 cc. of water. A total of 30 cc. of dimethylsulfate and 20 g. of potassium hydroxide in 30 cc. of water are added thereto simultaneously and in small quantities within half an hour while the temperature is maintained below 30° C. After these reactants have been added, the solution is heated in a boiling water bath for one hour and is then acidified to a pH of 2.3. The resultant solution is evaporated to dryness and the residue is purified in a similar manner as described in Example 3 in connection with the purification of the compound of Formula V. Thereby, the hydrochloride of the desired quaternary ammonium compound of Formula IX is obtained in the form of an orange oil, soluble in water and alcohol, and insoluble in acetone and ether. This compound is sufficiently pure for use or conversion into other compounds.

The compound is characterized by its diflavianate. For this purpose the crude oil is dissolved in 50 cc. of water and is treated with a boiling solution of 33 g. of flavianic acid in 100 cc. of water. The mixture is allowed to stand in a refrigerator over night to crystallize. The crystals are centrifuged and washed with water, alcohol, and ether. After drying, 35 g. of the flavianate (yield: 85%) are obtained. The compound can readily be recrystallized from water containing 2% of flavianic acid. Its melting point is 242–243° C. It is insoluble in acetone and ether, very difficultly soluble in alcohol, and soluble in hot water. It contains water of hydration and loses 5.3% of its weight by drying in a vacuum at 100° C.

Its analysis shows that it corresponds to the formula $C_{29}H_{32}O_{18}N_6S_2$ of the molecular weight of 816.74.

Calculated: 42.64% C; 3.95% H; 35.26% O; 10.29% N; 7.85% S. Found: 42.9% C; 4.0% H; 35.1% O; 10.2% N; 8.1% S.

This crystalline compound has not been described heretofore in the literature.

EXAMPLE 6

*Preparation of α,ε-bis-trimethylamino caproic acid, starting from DL-lysine hydrochloride of Formula XI*

10 g. of DL-lysine hydrochloride are dissolved in a solution of 8 g. of potassium hydroxide in 20 cc. of water. The solution is methylated and purified in a similar manner as described in Examples 3 and 5, by means of 40 cc. of dimethyl sulfate and 25 g. of potassium hydroxide in 40 cc. of water. The resultant compound of Formula X is obtained as dichloride in the form of a pale yellow oil, insoluble in acetone and ether, but soluble in water. This compound has two quaternary ammonium groups. It is converted into its diflavianate by reaction with 35 g. of flavianic acid under the conditions described in the preceding example.

On twice repeated recrystallization from water, 30 g. of the crystallized flavianate melting at 270° C. are obtained in the form of yellow-orange prisms with 2.37% of their weight of water of hydration. The product is insoluble in acetone, alcohol, benzene, chloroform, and ether; slightly soluble in cold water, and soluble in hot water.

Its analysis shows that the compound corresponds to the formula $C_{32}H_{38}O_{18}N_6S_2$ of the molecular weight of 858.81.

Calculated: 44.75% C; 4.46% H; 33.53% O; 9.79% N; 7.47% S. Found: 44.7% C; 4.4% H; 33.5% O; 9.1% N; 7.7% S.

This compound has not been described heretofore in literature.

It will be noted from the foregoing description of the present invention, that the reaction steps lead to the formation of new products and that novel techniques are provided herein. The resulting compounds have a high surface activity and form with water, strongly foaming compositions useful in the preparation of foods and pharmaceuticals, such as nutrients and vitamin adjuvants.

The α,ε-bis-trimethylamino caproic acid dichloride, furthermore, has a surprisingly high lipotropic activity which even surpasses that of choline, the standard lipotropic compound. The following tests clearly demonstrate this lipotropic effect.

Four groups of four rats each were used in these tests.

(a) Group a was kept on a normal diet and served as control.

(b) Group b was kept on a diet deficient in choline similar to that of Griffith (J. Am. Chem. Soc. Vol. 63, 1931, page 929), containing 0.3% of cystine and 5% of protein, i.e. rich in cystine and poor in protein.

(c) Group c was kept on the same diet as Group b but each animal received by oral administration 6 mg. of choline per day.

(d) Group d was kept on the same diet as Group b but each animal received by oral administration 10 mg. of α,ε-bis-trimethylamino caproic acid di-chloride per day.

The following table clearly illustrates the surprising lipotropic properties of α,ε-bis-trimethylammonium caproic acid di-chloride while choline, in the doses administered, is ineffective. The results given in said table are obtained after 14 days of treatment, after which time the animals were sacrificed.

TABLE

| Group | Animal No. | Weight of liver in percent of total weight | Amount of total lipids in g. per 100 g. of dried liver |
|---|---|---|---|
| a | 1 | 4,320 | 10.4 |
|   | 2 | 6,160 |  |
|   | 3 | 5,980 | 13.3 |
|   | 4 | 5,010 | 11.4 |
| Mean values |  | 5,370 | 11.7 |
| b | 1 | 6,590 | 38.3 |
|   | 2 | 5,220 | 20.2 |
|   | 3 | 5,780 | 29.7 |
|   | 4 | 5,530 | 29.8 |
| Mean values |  | 5,770 | 29.5 |
| c | 1 | 5,680 | 31.7 |
|   | 2 | 6,890 | 37.0 |
|   | 3 | 5,130 | 21.0 |
|   | 4 | 6,130 | 28.0 |
| Mean values |  | 5,960 | 29.4 |
| d | 1 | 5,350 | 21.3 |
|   | 2 | 5,880 | 19.5 |
|   | 3 | 5,690 | 22.6 |
|   | 4 | 5,530 | 21.0 |
| Mean values |  | 5,610 | 21.1 |

The lipotropic activity of α,ε-bis-trimethylammonium caproic acid di-chloride has been made use of in the treatment of liver failures such as cirrhosis, in the treatment of fatty liver caused by excessive deposition of fat in the liver cells due to alcoholism, metabolic disorders, and the like, whereby said compound has successfully been administered in place of choline chloride.

We claim:

The caproic acid substituted in α- and ε-position by trimethyl ammonium chloride groups.

(References on following page)

References Cited by the Examiner

UNITED STATES PATENTS

| | | | |
|---|---|---|---|
| 2,743,294 | 4/56 | Fakstorp | 260—501 |
| 2,794,045 | 5/57 | Beaufour et al. | 260—501 |
| 2,840,603 | 6/58 | Mock et al. | 260—518 |
| 2,870,201 | 1/59 | Pollack | 260—534 |
| 2,894,026 | 7/59 | Hause et al. | 260—534 |
| 2,917,541 | 12/59 | Anatol et al. | 260—518 |
| 2,927,107 | 3/60 | Velluz et al. | 260—518 |
| 2,978,381 | 4/61 | Freedman et al. | 167—65 |
| 2,980,585 | 4/61 | Stambul | 167—65 |

FOREIGN PATENTS

| | | |
|---|---|---|
| 556,345 | 4/58 | Canada. |
| 1,093,998 | 12/54 | France. |
| 1,100,016 | 3/55 | France. |
| 1,112,766 | 11/55 | France. |

OTHER REFERENCES

Gordon, J. Biol. Chem., Volume 127, 1939, pages 487–94.

Michell et al., The Biochemistry of the Amino Acids, pages 117–118 (1929).

Schmidt, Chemistry of the Amino Acids and Proteins, 245 (1938).

LEON ZITVER, *Primary Examiner.*